United States Patent [19]

Krishnakumar et al.

[11] Patent Number: 4,786,455
[45] Date of Patent: Nov. 22, 1988

[54] ROTARY INJECTION TURRET AND METHOD OF UTILIZING THE SAME IN THE MAKING OF PREFORMS

[75] Inventors: Suppayan M. Krishnakumar; Ieuan L. Harry, both of Nashua; Martin H. Beck, Brookline, all of N.H.

[73] Assignee: The Continental Group, Inc., Norwalk, Conn.

[21] Appl. No.: 236,960

[22] Filed: Feb. 23, 1981

[51] Int. Cl.⁴ .................. B29C 45/04; B29C 45/72; B29C 45/76

[52] U.S. Cl. .................. 264/237; 264/297.2; 264/297.6; 264/297.8; 264/328.8; 264/328.14

[58] Field of Search ............... 264/538, 328.8, 328.13, 264/328.14, 327, 40.1, 297.2, 297.6, 297.8

[56] References Cited

U.S. PATENT DOCUMENTS

| | | |
|---|---|---|
| T949,004 | 8/1976 | Delaire et al. |
| 3,609,803 | 10/1971 | Fattori . |
| 3,707,591 | 12/1972 | Chalfant . |
| 3,887,316 | 6/1975 | Hestehave . |
| 3,940,231 | 2/1976 | Uhlig ................................. 425/445 |
| 4,038,006 | 7/1977 | Farrell ............................... 425/525 |
| 4,056,590 | 11/1977 | Farrell . |
| 4,083,903 | 4/1978 | Gilbert et al. ..................... 264/40.3 |
| 4,116,606 | 9/1978 | Valyi .................................. 425/526 |
| 4,136,146 | 1/1979 | Ninneman ........................ 264/237 |
| 4,140,464 | 2/1979 | Spurr et al. ....................... 425/533 |
| 4,201,535 | 5/1980 | Ninneman ........................ 425/548 |
| 4,241,008 | 12/1980 | Flamand ........................ 425/534 X |
| 4,256,689 | 3/1981 | Gardner ........................... 264/328.8 |

FOREIGN PATENT DOCUMENTS

| | | |
|---|---|---|
| 2819813 | 11/1978 | Fed. Rep. of Germany . |
| 2315287 | 2/1979 | Fed. Rep. of Germany . |
| 2337025 | 7/1977 | France . |
| 1410635 | 10/1975 | United Kingdom . |
| 1507551 | 4/1978 | United Kingdom . |
| 2035188 | 6/1980 | United Kingdom . |
| 2053772 | 2/1981 | United Kingdom . |

Primary Examiner—Jan H. Silbaugh
Assistant Examiner—Leo B. Tentoni
Attorney, Agent, or Firm—Charles E. Brown; Paul Shapiro; Charles A. Brown

[57] ABSTRACT

This relates to an apparatus for injection molding preforms for beverage bottles wherein a minimum cycle time is involved. Cores over which thermoplastic material is injection molded to form preforms for use in the blow molding of bottles are provided in sets and carried by a rotary turret so that as soon as the injection molded thermoplastic material has sufficiently set to permit its transfer with its associated core out of an injection mold cavity, the apparatus may be actuated to remove first injection molded preforms and thereafter immediately present a new set of cores to the injection mold cavities. This provides ample time for the cooling of the preforms so that when removed from the cores they will not be unduly deformed. In accordance with the feasible use of the apparatus, plural preforms, on the order of twenty-four and greater, may be formed with a cycle time on the order of 10–12 seconds.

4 Claims, 4 Drawing Sheets

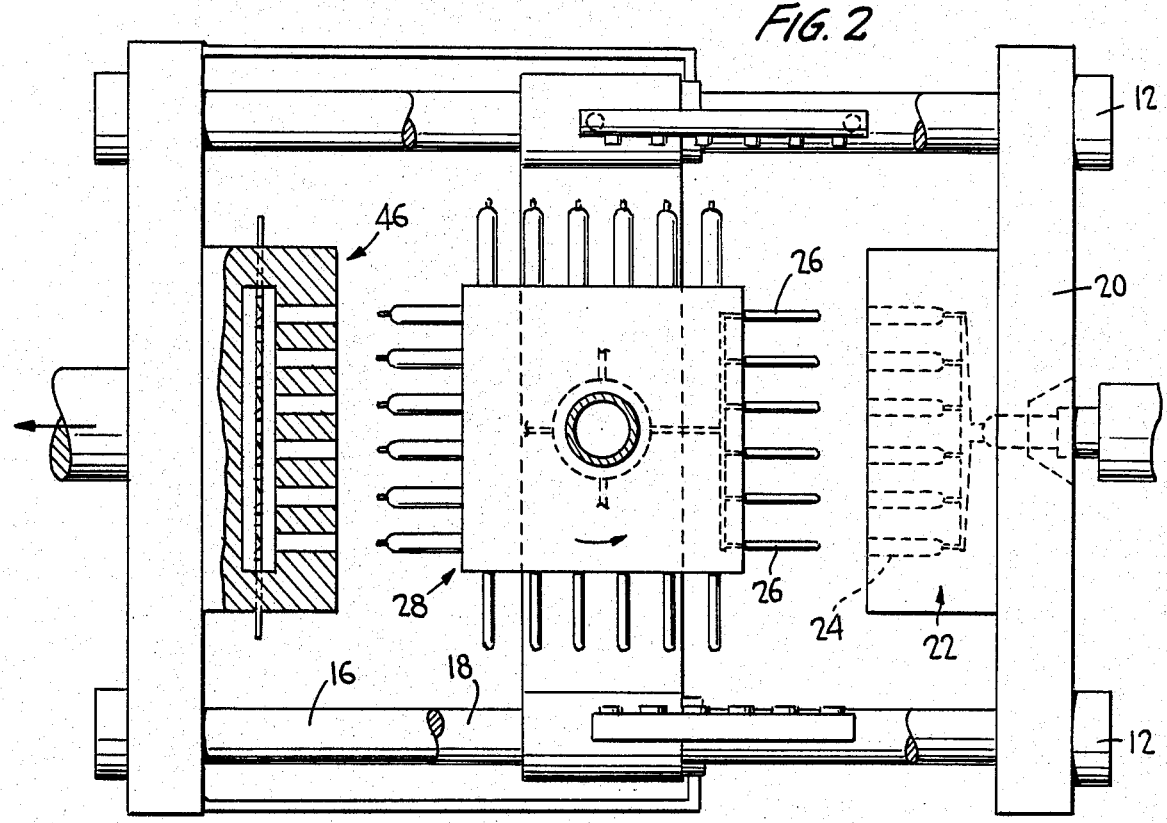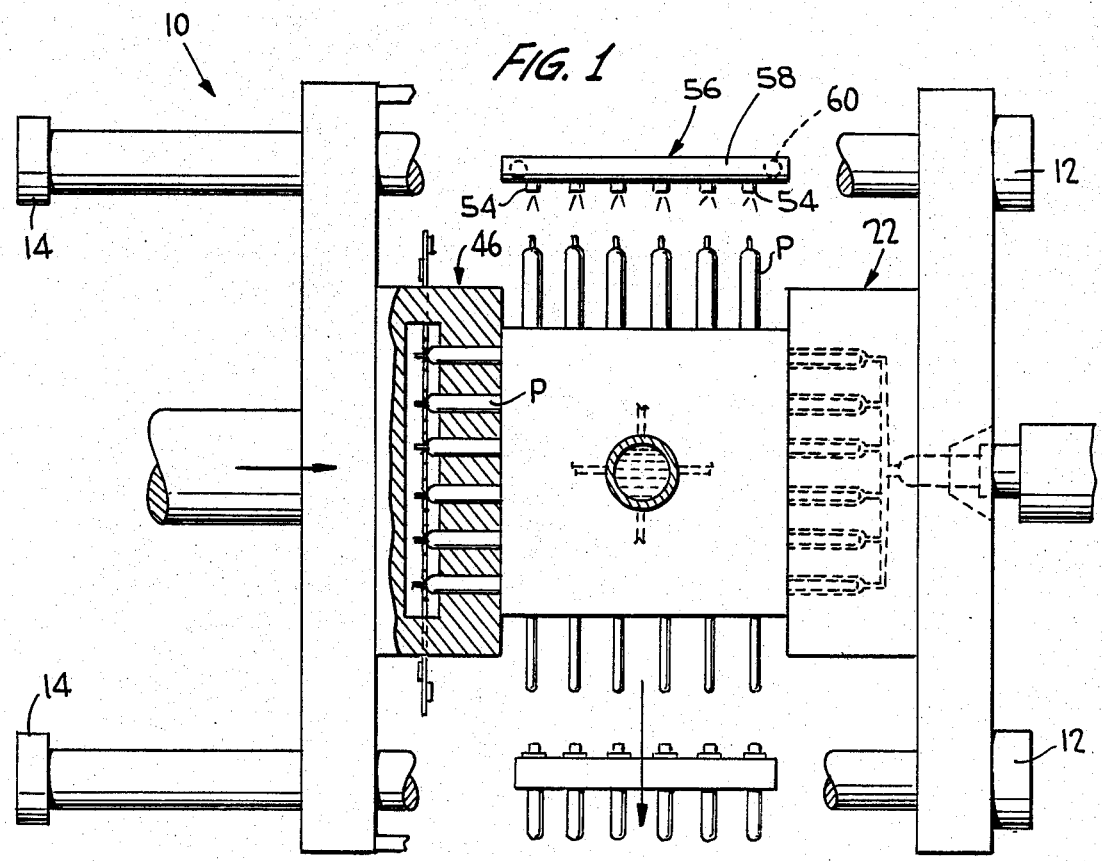

ROTARY INJECTION TURRET AND METHOD OF UTILIZING THE SAME IN THE MAKING OF PREFORMS

This invention relates in general to new and useful improvements in the forming of beverage bottles, and more particularly in the forming of preforms from which beverage bottles are formed by a blow molding process.

At the present time, one mode of making beverage bottles is, in one operation, to form preforms by an injection molding process and, in a separate operation wherein the preforms are re-heated, blow molding the preforms into beverage bottles. This invention relates solely to the forming of the preforms.

At the present, the cycle time for making a typical preform is on the order of 30 seconds. A good portion of the time is taken up by the cooling mode where the preform temperature has to be brought below its crystalization temperature range. Also taking critical time is the ejection of the preforms where the mold has to stay open while the preforms are being pressed off the cores, followed by the same cores returning to the same injection mold cavities.

In accordance with this invention, it is proposed to provide an apparatus and method wherein preforms can be injection molded with a cycle time on the order of 10-12 seconds.

In accordance with this invention, the time that the preform is retained in the injection mold cavity is reduced to a minimum by withdrawing the preform from the injection mold cavity while it is still not shape retaining but being carried by a core over which it is injection molded until it is able to maintain its configuration, and thereafter is retained on the core over which it is injection molded while it is permitted to cool, preferably with assistance.

In accordance with this invention, it is proposed to provide a plural set of cores which are carried by a turret so that after a set of preforms is injection molded over the cores of a set in a plurality of cavities in an injection mold, after a minimum cooling time within the cavities the cores and molded preforms carried thereby may be removed from the cavities and indexed to other locations while cores of the next set of cores move into enclose the cavities. This provides ample time for the completion of the cooling phase of the preforms and the removal or ejection of the preforms from the cores.

It has been further found that a multiple cavity conditioning mold may be mounted in opposition to the injection mold so that final cooling of the preforms is controlled within the conditioning mold at the same time as other preforms are being injection molded.

Another deficiency of present preform molding operations is that while only a maximum of 3 seconds may be required to inject the thermoplastic material into the injection mold cavities, the recovery time of the plasticizer is on the order of 7-9 seconds, and therefore, if the recovery of the plasticizer is not initiated until after the thermoplastic material which has been injection molded to form the preforms is permited to set or crystalize, there is a further delay and an increase in cycle time. Accordingly, in accordance with this invention, as soon as the required thermoplastic material has been injected into the injection mold cavities, the plasticizer is isolated from the injection mold and the necessary packing pressure is maintained by means of a booster. Thus, the recovery of the plasticizer may be initiated as soon as the injection step has been completed.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic plan view, with parts broken away and shown in section, of a preform forming apparatus in accordance with this invention, showing the apparatus in its closed condition.

FIG. 2 is a schematic plan view, with parts in section, of the apparatus of FIG. 1, showing the same in its open condition.

Figure 3:
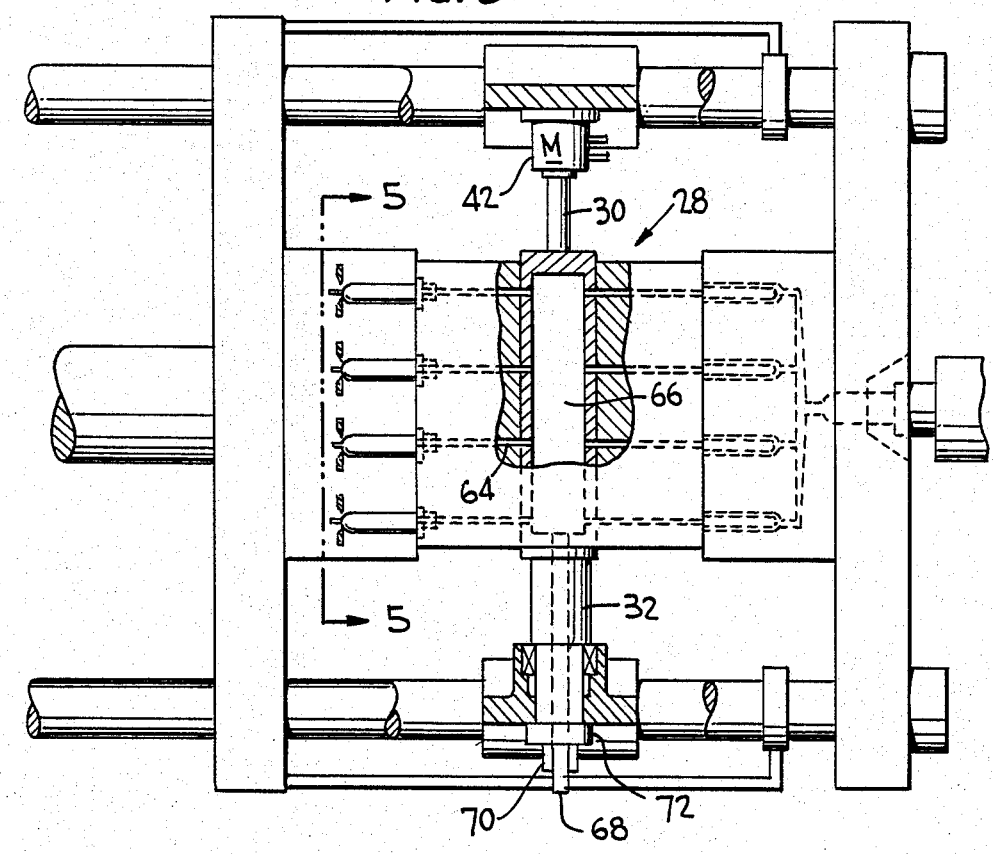
FIG. 3 is a vertical elevational view, with parts broken away and shown in section, of the apparatus of FIG. 1 in its closed condition.
Figure 4:
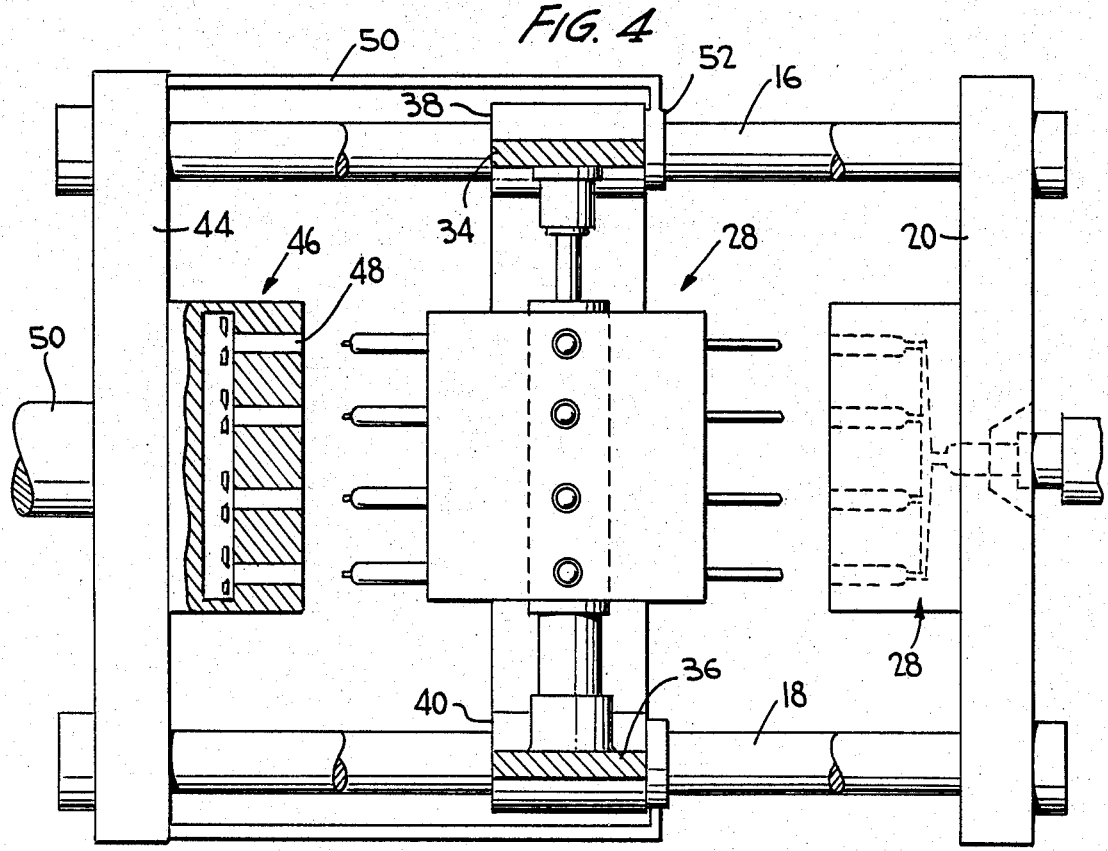
FIG. 4 is an elevational view similar to FIG. 3, with the apparatus in its open condition.

Referring now to the drawings in detail, it will be seen that the apparatus is generally identified by the numeral 10 and includes pairs of vertical supports 12 and 14. Upper and lower combined support and guide rods 16 and 18 extend between each pair of supports 12, 14.

A header 20 is fixedly mounted adjacent the supports 12 and carries a multiple cavity injection mold 22. In the illustrated embodiment of the invention, the injection mold 22 has twenty-four cavities 24 arranged in four horizontal rows of six cavities each. With respect to this, it is to be understood that the number of cavities may be increased to thirty-six and possibly forty-eight.

Figure 6:
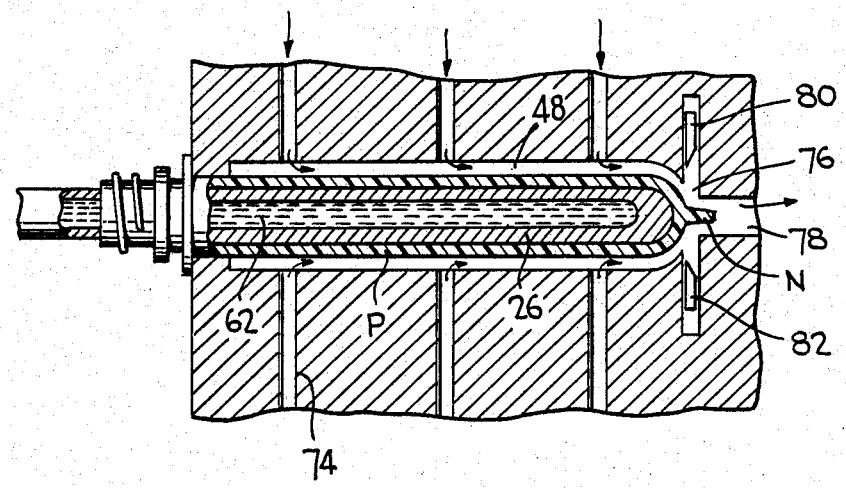
FIG. 6 is an enlarged schematic fragmentary vertical sectional view taken through one of the cavities of the conditioning mold.

In order to injection mold a preform P, best shown in FIG. 6, there is positioned in each of the cavities 24 a core 26. There is a plurality of sets of cores 26, and each set of cores contains a number of cores equal to the number of cavities 24, with the cores 26 being positioned in the same arrangement as the cores 24.

In accordance with this inventinn, the apparatus 10 has four stations, and thus there are four sets of cores 26. The plural sets of cores 26 are carried by a turret 28 which is mounted by way of vertical shafts 30 and 32 for indexing about a vertical axis. The shafts 30, 32 are carried by frame members 34, 36 which, in turn, extend between sleeves 38 and 40. The sleeves 38 and 40 are slideably mounted on the guides 16 and 18, respectively.

For purposes of illustration only, the shaft 30 is shown as being carried by an indexing motor 42 which, when actuated, will rotate the turret 28 90°.

There is also a further platen or support 44 which is mounted on the guide rods 16, 18 in opposition to the header 20 and for movement along the guide rods toward and away from the header 20. The support 44 carries a conditioning mold 46 which has formed therein conditioning cavities 48 which correspond in number and position to the cavities 24 in the injection mold 22.

It is to be understood that one or more fluid motors, of which the extensible rod 50 only has been illustrated, is connected to the support 44 for moving the same toward and away from the header 20 to close and open the apparatus.

In the preferred embodiment of the invention, it is to be understood that the support 20 is fixed and the turret 28 and the support 44 are movable with the movement of the turret 28 being one-half of that of the support 44.

Opening movement of the turret 28 relative to the injection mold 22 may be effected by an extensible rod 50 which is, in turn, connected to a collar 52 carried by each of the guide rods 16, 18.

Referring now to FIG. 1, it will be seen that when the apparatus is in its closed position, at what may be considered the first station, a first set of cores 26 is positioned within the cavity 24 of the injection mold 22 and the cavities are closed ready for the injection of molten thermoplastic material into the cavities.

At a second station, rotated 90° from the first station, newly formed and still very hot preforms P carried by a second set of cores are aligned with nozzles 54 of a cooling unit 56. The nozzles 54 are equal in number to the cores and are positioned in accordance with the arrangement of the cores so that air is separately blown on each of the preforms P. The nozzles 54 are carried by a manifold 58 to which there is connected a supply line 60. It is to be understood that the temperature of air directed onto the preforms P may be controlled to provide the desired cooling of the preforms.

The conditioning mold 46 is located at the third station in opposition to the injection mold 22 and the conditioning cavities 48 thereof for receiving therein partially cooled preforms P where final cooling of the preforms is effected so that the thermoplastic material has sufficiently set or crystalized for the ejection or removal of the preforms from the cores.

With respect to the third station and the conditioning mold 46, it is to be first of all noted that the cores 26, as shown in FIG. 6, may be hollow to define a coolant chamber 62. Each core 26 is connected by means of an internal coolant passage 64 in the turret 28 to a central manifold 66 which, in turn, has connected thereto a supply line 68 and a return line 70 which are coupled to the shaft 32, which is hollow, by means of a suitable rotary coupling 72.

It is to be understood that the temperature of the coolant supplied to the cores 26 will be controlled so that there may be controlled cooling of the preforms P from the interior thereof radially outwardly. In addition, each conditioning cavity 48 is oversized as compared to the preform P so that conditioning gas (air) may be circulated around the preform as shown in FIG. 6. A plurality of coolant lines 74 open generally radially into the cavities 48. Each cavity 48 also has an exit opening 76 at the end thereof remote from the turret 28 and an associated horizontal discharge passage 78.

Figure 5:
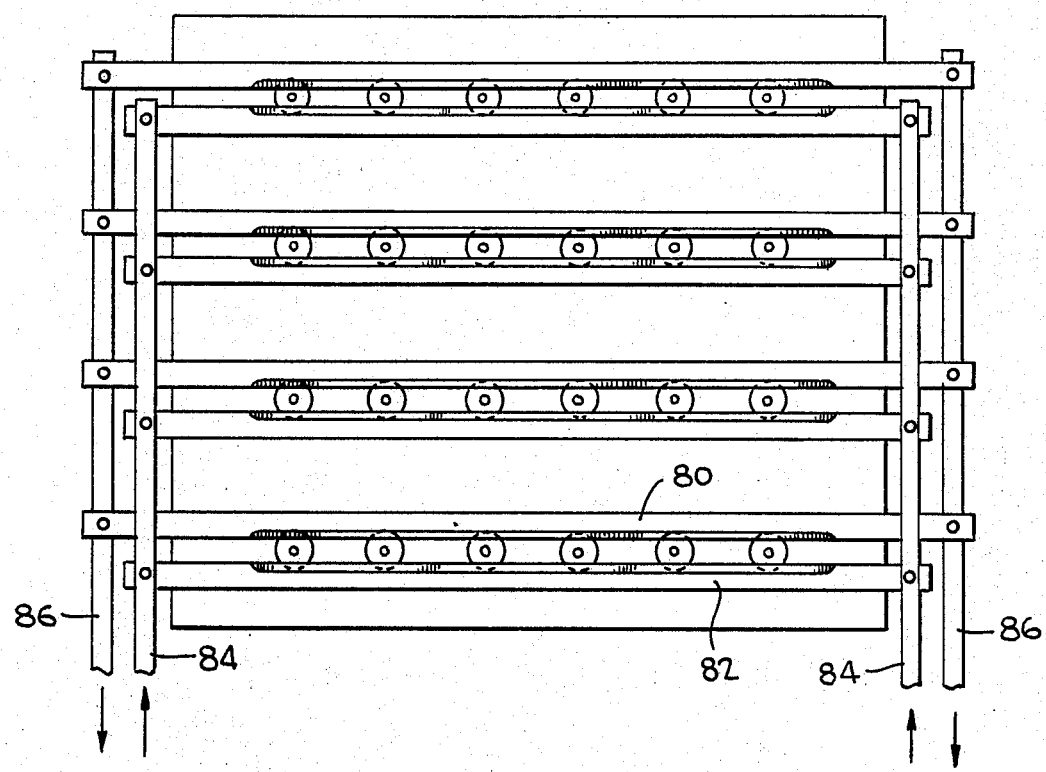
FIG. 5 is a fragmentary vertical sectional view taken generally along the line 5—5 of FIG. 3, showing generally the arrangement of means for removing nubs from preforms in the conditioning mold.

Referring now to FIG. 6 in particular, it will be seen that each preform P, when injection molded, is provided with a short nub N. The nubs N result from the injection mold 22 being pinless or valveless, with the result that there is some solidification within the sprues of the injection mold 22 and a resultant separation of the partially crystallized thermoplastic material in the outer portions of the sprues from the still molten thermoplastic material in the inner portion of the sprues. The nubs N must be removed prior to the blow molding operation. They may be cut off, ground, or otherwise removed. In the illustrated embodiment of the invention each nub is cut off by means of opposed cooperating blades 80, 82 which are movable in opposite directions to cooperate with one another. In the schematic illustration of FIG. 5, it will be seen that the blades 82 of each row of conditioning mold cavities 48 are connected together by actuators 84. In a like manner, the blades 80 are connected together by actuators 86.

As soon as each preform P and its associated core 26 are positioned within the conditioning mold 46, the blades 80, 82 are actuated to cut off the nubs N. The severed nubs are then blown out through the discharge opening 76 and the passage 78 to a location where they may be collected if so desired.

Figure 7:
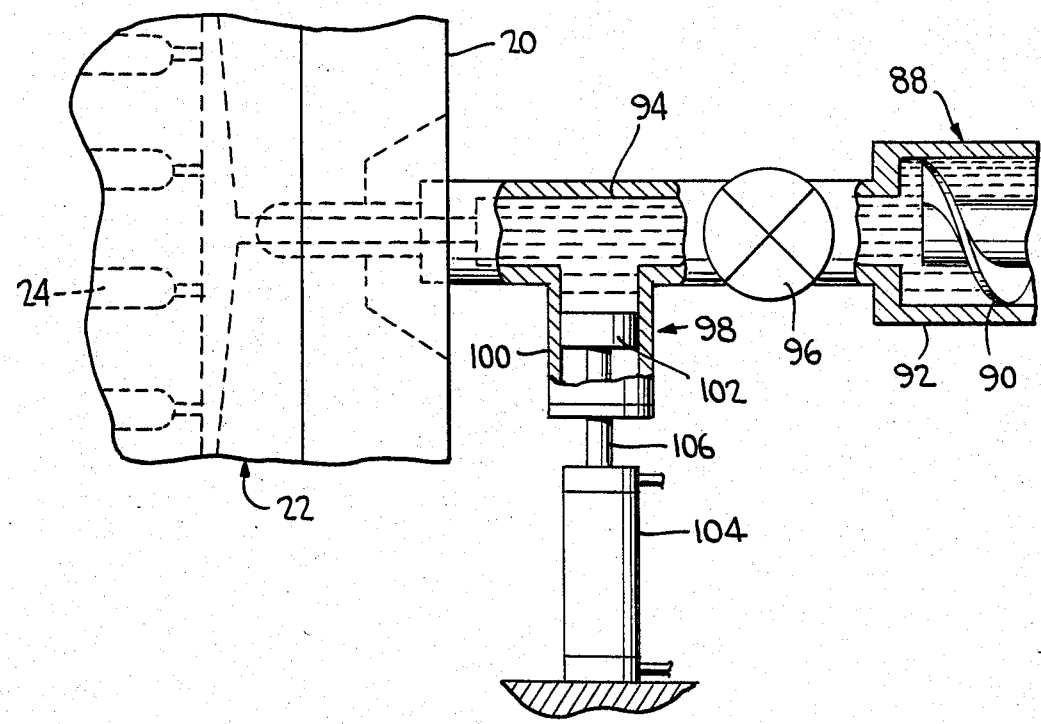
FIG. 7 is a diagrammatic plan view, with parts broken away and shown in section, of the means for supplying molten thermoplastic material to the injection mold.

Reference is now made to FIG. 7 wherein the apparatus for injecting thermoplastic material into the cavities 24 is illustrated. This includes a plasticizer 88 including a rotatable and axially movable screw 90. The plasticizer 88 has extending from a barrel 92 thereof a supply line 94 for molten thermoplastic material. Closely adjacent the barrel 92, the supply line 94 is supplied with a shutoff valve 96.

The supply line 94 also includes a booster 98 in the form of a cylinder 100 having therein a piston 102 which is positioned by an extensible fluid motor 104 having a piston rod 106 which carries the piston 102.

OPERATION

With the apparatus 10 in its closed position of FIG. 1, a first set of preforms P will be injection molded onto the cores 26 positioned in the injection mold cavities 24. Plasticized molten thermoplastic material is forced under high pressure by the screw 90 through the supply line 94 into the individual cavities 24 until all of the cavities 24 are filled with molten thermoplastic material, at which time the valve 96 is moved to a closed position. The screw 90 is now free to be moved to the right and rotated for receiving and plasticizing further thermoplastic material. Recovery time for the plasticizer 88 is on the order of 7–9 seconds. A lower packing pressure is maintained on the thermoplastic material within the supply line 94 and the cavity 22 by way of the booster 98. When the thermoplastic material is being injection molded, the piston 102 of the booster 98 is retracted to permit a small amount of molten thermoplastic material to enter into the cylinder 100. As soon as the valve 96 closes, the piston 102 moves forward and assures the filling of the cavities 22 and the maintaining of a low pressure packing pressure on the molten thermoplastic material.

After the initial injection of the thermoplastic material into the cavities 24, the injected thermoplastic material is permitted to cool within the injection mold 22 under the influence of coolant in the injection mold (not shown) and coolant introduced into the cores 26 until such time as the molten thermoplastic material forming the preforms P has set or crystalized such that it may be removed from the associated cores without undue deformation of the preforms. This initial cooling time is on the order of 5–6 seconds, at which time the cores 26 may be retracted from the injection mold 22 carrying with them the newly molded preforms P.

After the cores 26 have cleared both the injection mold 22 and the conditioning mold 46, the turret 28 may be indexed in a counterclockwise iirection, as shown in FIG. 2, to move the cores carrying the newly molded preforms P to the second station and presenting a second set of cores 26 to the first station and the injection mold 22 thereat. At this time, the conditioning mold 46 again moves to the right, carrying with it the injection mold 28 so that the apparatus is again closed.

The injection molding and limited cooling of the preforms in the injection mold 22 is again performed on a second set of cores, while gas jets from the nozzles 54 are directed onto the newly formed preforms so as to provide for a controlled cooling thereof.

In the next machine operational stage, when the turret 28 is again rotated, the first set of preforms is positioned within the conditioning mold 46 for final conditioning. Thereafter, when the third set of preforms has been formed and sufficiently cooled, the machine is again actuated so that the first formed preforms are directed to the fourth station where they are removed from the cores 26 in a conventional manner.

Although in the illustrated embodiment of the invention the support 20 is fixed and the support 44 and the turret 28 are moved with the movement of the turret 28 being one-half that of the support 44, it is to be understood that the turret could be fixed and the supports 20 and 44 first moved together and then apart. It is also feasible, although generally undesirable, that the support 44 and the conditioning mold 46 be fixed and the turret 28 and the support 20 be movable.

In accordance with tests performed with respect to this apparatus, preforms may be formed with a cycle time on the order of 10–12 seconds as opposed to the present cycle time on the order of 30–32 seconds. It is to be understood that machine operating time, i.e. for the opening and closing of the machine, is on the order of 2–3 seconds. Thus, the preforms are permitted to be retained within the cavities a time generally equal to the plasticizer recycling time less the machine operating time.

When the injection time is 2 seconds and the machine operating time is 4 seconds and the holding time of the preform within the injection molds is 6 seconds, the total cycle time is 10 seconds. On the other hand, if the injection time is raised to 3 seconds and the machine time is also 3 seconds, with a 9 second recovery time for the plasticizer, the complete cycle time will be 12 seconds. It will be readily apparent that this highest cycle time is materially less than the permissible cycle time of preform injection molding apparatuses, and therefore the production of preforms may be greatly increased as compared to the present state of the art.

Although only a preferred embodiment of the apparatus and the operation thereof has been specifically illustrated and described, it is to be understood that minor variations may be made in the apparatus and the method of utilizing the same so as to permit minimum cycle time for the forming of plastic preforms without departing from the spirit and scope of the invention as defined by the appended claims.

We claim:

1. A method of forming preforms for bottles comprising the steps of providing a multiple cavity injection mold, providing a plurality of sets of cores for sequential presentation of the sets of cores to the cavities, providing a plasticizer having an output capacity at least as great as the total requirements of said cavities, presenting the cores of a first of the sets of cores to the cavities and closing the cavities, utilizing the plasticizer injecting a molten thermoplastic into all of the cavities at a high pressure, and filling the cavities about the cores positioned therein, isolating the plasticizer from the cavities and initiating recovery of the plasticizer while maintaining a lower packing pressure in the injection mold, maintaining the molded preform in the cavities for a time to permit the thermoplastic to set substantially only to the extent that first molded preforms carried by the cores can be removed from the cavities, removing the first set of cores from the cavities and presenting a second of the sets of cores to the cavities, and while injection molding a second set of preforms, cooling the first set of preforms by blowing a coolant thereon, removing the second set of cores and the second set of preforms from the injection mold, presenting a third set of cores to the cavities, while injection molding a third set of preforms, cooling the second set of preforms, and conditioning the cooled first set of preforms, removing the third set of cores and the third set of preforms from the injection mold, presenting a fourth set of cores to the cavities; and while injection molding a fourth set of preforms, conditioning the cooled set of preforms, and removing the first set of preforms from the first set of cores and thereby making the first set of cores available for presentation to the injection mold.

2. A method according to claim 1 wherein said conditioning of cooled preforms includes further and controlled cooling of the cooled preforms.

3. A method according to claim 1 wherein said conditioning of cooled preforms includes further and controlled cooling of the cooled preforms within cavities.

4. A method according to claim 3 wherein the first cooling of preforms is in the open.

* * * * *